United States Patent [19]

Ciliberti et al.

[11] Patent Number: 4,539,025
[45] Date of Patent: Sep. 3, 1985

[54] FILTERING SYSTEM

[75] Inventors: David F. Ciliberti, Murrysville Boro; Thomas E. Lippert, Murrysville, both of Pa.

[73] Assignee: Westinghouse Electric Corp., Pittsburgh, Pa.

[21] Appl. No.: 654,697

[22] Filed: Sep. 26, 1984

[51] Int. Cl.³ .............................................. B01D 46/04
[52] U.S. Cl. ........................................ 55/302; 55/335; 55/341 NT; 55/378; 55/523
[58] Field of Search .................................. 55/301–303, 55/331, 334–336, 341 NT, 341 M, 341 H, 378, 379, 523

[56] References Cited

U.S. PATENT DOCUMENTS

| | | | |
|---|---|---|---|
| 3,178,868 | 4/1965 | Gibby | 55/302 X |
| 3,396,516 | 8/1968 | Ballard | 55/341 NT |
| 3,509,698 | 5/1970 | Medcalf et al. | 55/379 X |
| 3,535,852 | 10/1970 | Hirs | 55/379 X |
| 3,594,992 | 7/1971 | Carr et al. | 55/302 |
| 3,716,971 | 2/1973 | Reinauer | 55/302 X |
| 3,816,977 | 6/1974 | Gordon et al. | 55/341 NT |
| 3,826,066 | 7/1974 | Higgins | 55/379 |
| 3,832,833 | 9/1974 | Cox | 55/378 |
| 3,853,508 | 12/1974 | Gordon et al. | 55/341 NT |
| 3,898,067 | 8/1975 | Genton | 55/341 NT |
| 3,999,968 | 12/1976 | Brookman | 55/341 NT |
| 4,306,888 | 12/1981 | Cheng | 55/341 NT |
| 4,336,035 | 6/1982 | Evenstad et al. | 55/379 X |
| 4,343,631 | 8/1982 | Ciliberti | 55/302 |

FOREIGN PATENT DOCUMENTS

| | | | |
|---|---|---|---|
| 1424863 | 2/1976 | United Kingdom | 55/302 |
| 789133 | 12/1980 | U.S.S.R. | 55/302 |
| 897261 | 1/1982 | U.S.S.R. | 55/302 |

Primary Examiner—Robert Spitzer
Attorney, Agent, or Firm—Daniel C. Abeles

[57] ABSTRACT

A filter system wherein a cylindrical shell having open ends and a gas-impervious wall with means for supporting a filter tube coaxially within the shell to form an annular chamber therebetween has means for securing the filter tube to the other open end, such that gases from the enclosure must pass through the filter tube into the annular chamber and then out of the cylindrical shell. A jet pulse means is provided to provide a jet pulse of fluid to the annular chamber to flex the filter tube inwardly to dislodge solids collected on the interior surface of the filter tube.

23 Claims, 6 Drawing Figures

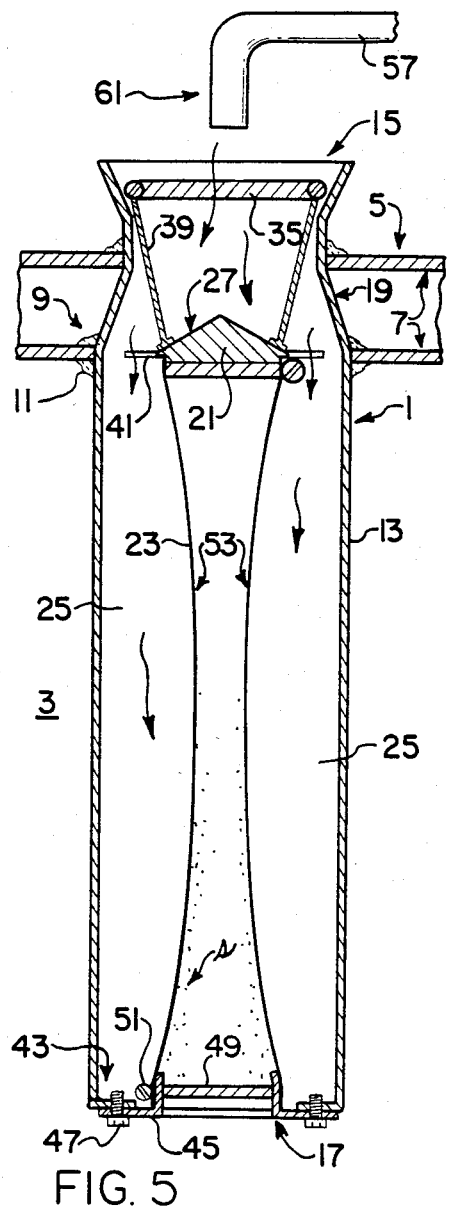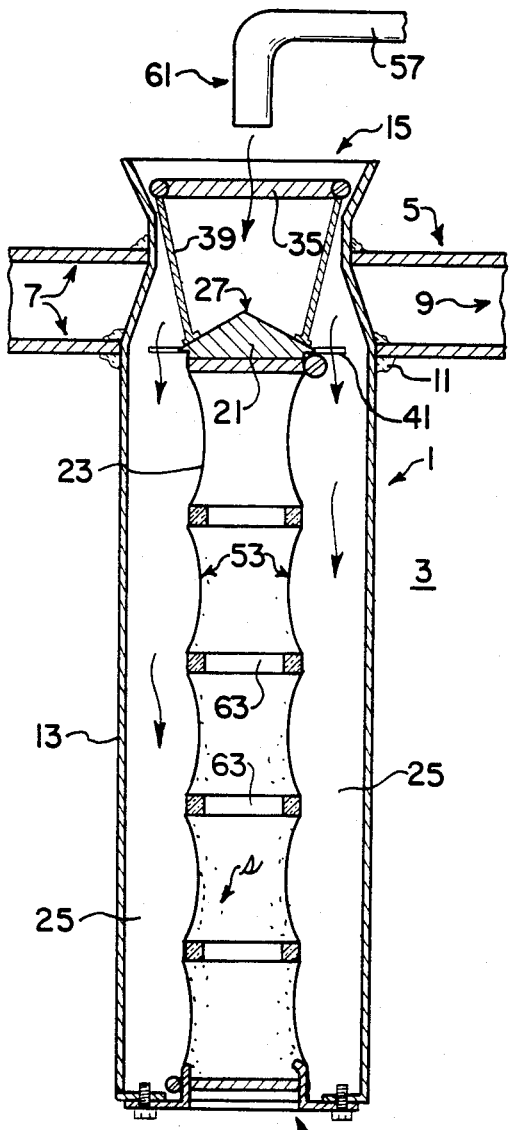
FIG. 5
FIG. 6

FILTERING SYSTEM

BACKGROUND OF THE INVENTION

High temperature filtration of particulates has become an important component in many emerging technologies. Advanced coal conversion technologies, such as fluid bed gasification and combustion, benefit (if not depend) on removal of particulates at temperatures in the range of about 500° to 1100° C. Similarly, many of the new and diverse technologies known as cogeneration hold promise for the application of high temperature filtration. These applications range from gas cleaning for biomass gasification to power generation from the incineration of municipal solid wastes. The common technical thread among these applications is the need to remove particulates from gas streams at high temperature (about 300° to 1100° C.) so that process equipment (such as rotating machinery and heat exchange surfaces) will remain functional and efficient over a reasonable period of time.

A primary technology for high temperature filtration is the development of woven cloths composed of ceramic fibers. These materials can be fabricated into tube or bag filters that closely resemble conventional woven glass filter bags. Such ceramic woven cloth filters will give cleaning efficiencies that are adequate to satisfy both process equipment requirements and environmental constraints, and can be used at high temperatures and pressures.

A problem associated with the commercial viability of filtering technology using ceramic woven cloth filters is that of bag life or mean time to failure. This parameter has not been quantified to date in a statistically sound manner because of the difficulties associated with the conduct of testing at these hostile conditions. Much of the current concern with regard to bag life centers on the method of cleaning used to date. In high temperature, high pressure applications, the pulse jet method has been used exclusively for bag cleaning. This choice has been made because the method gives effective cleaning, involves no moving parts within the high temperature containment and is mechanically simple and inexpensive to implement. In this method, bags are pulled over a cylindrical support cage and this assembly is then supported by a tube sheet that separates the lower (dirty) side of the baghouse from the upper (clean) side. Dusty gas flows radially inward through the bag and exits the top of the bag into the clean side. Particulate is filtered on the outside surface of the bag resulting in a dust deposit or "cake" that grows in thickness with time. Eventually, the dust deposit causes a resistance to flow that is too high to be tolerated and the dust deposit must be removed. The pulse jet method requires that a pulse tube or orifice be located over the top of the bag and be connected to an external source of high pressure gas. Typically, a fast acting solenoid valve is used to administer a short, (25 to 100 ms) high pressure burst of gas down the inside of the bag. This pulse causes rather violent motion of the bag accelerating it radially outward to velocities that are typically 150 to 450 cm./sec. At a point when the bag is fully inflated and all of the fabric slack is taken up, the bag is rapidly decelerated as it vigorously snaps taut. It is this rapid deceleration that is thought to play the major role in separating the dust deposit from the surface of the filter media.

We have found this method to be very effective in regenerating clean surfaces on the bag which in turn, gives rise to very stable pressure drop performance of the bag system. The difficulty with this cleaning technique arises from the rather violent nature of the process and the high stresses that it imposes on the fabric of the filter media. In this process, considerable "hoop" stress is imposed on the fabric as it becomes taut. This creates fiber to fiber motion, rubbing and consequent abrasion as the fabric stretches at each pulse. This abrasion can lead to gradual loss of fabric strength and eventual failure. Subsequent to inflation, the bag is rather forcefully thrown back on the support cage surface as the flow through the bag resumes its normal direction from outside to in. During this process, there is potential for gradual fiber damage by rubbing against the support. Another phenomena occurs in pulse jet cleaning that can cause fabric damage. This is the eductor or venturi effect that occurs near the top of the bag. The high velocity of the pulse jet causes a low pressure at the bag top and actually results in inward suction during the pulse. At a point that is typically 15 to 30 centimeters down, there is a sharp transition from negative to positive pressure inside the bag with the bag surface being sucked in against the support above, and vigorously pushed out away from the cage below. This area is highly stressed, and subjected to rapid motion and sharp deformations all of which can compromise fabric life. This is especially true for high modulus, brittle fibers such as conventional glass and the ceramic fibers used in high temperature bags. A description of jet pulse cleaning and reverse flow cleaning of tubular filters is given in "How Hot Gas Cleaning Improves the Economics of Electricity-from-Coal", G. P. Reed, Filtration and Separation, March/April 1984.

It is an object of the present invention to provide a filter system wherein the cleaning of the filter bag or tube retains the mechanical simplicity and effectiveness of pulse jet cleaning while incorporating much gentler aspects of reverse flow bag cleaning.

SUMMARY OF THE INVENTION

A filter system, especially useful in high temperature filter applications using ceramic woven cloth filters, has an impervious cylindrical shell open at both ends, with a constriction, or venturi, located adjacent one open end. The cylindrical shell is supported with an enclosure for a gas flow to be subjected to filtration so that gases must exit the enclosure through the shell. The cylindrical shell has means adjacent the one open end for supporting a filter tube coaxially therein in spaced relationship to the impervious wall of the shell, forming an annular chamber therebetween and means for securing the filter at the other open end of the shell to seal the open end so that gases entering the shell must pass through the filter tube into the annular chamber prior to discharge through the one open end. Means are provided for jet pulsing the annular chamber to flex the bag inwardly and dislodge dust therefrom for cleaning.

The support means for the filter tube is preferably a cone-shaped, solid insert having a channel formed about the bottom periphery to which the filter tube is secured, the insert suspended from a ring-like member by connectors, the insert having radial projections thereon for centering the same in the cylindrical shell, while the means for sealing the bag at the other end of the shell preferably comprises a clamp which co-acts with a circular collar that is attached to an inwardly directed flange at that end of the cylindrical shell.

BRIEF DESCRIPTION OF THE DRAWINGS

In the drawings:

FIG. 5 is a cross-sectional view similar to FIG. 1 showing the inward flexing of the filter tube during cleaning; and FIG. 6 is a view similar to FIG. 5 wherein spaced hoops are provided in the filter tube to control the amount of flexing thereof during cleaning.

DETAILED DESCRIPTION

The present filter system provides a means for jet pulse cleaning of filter bags or tubes, such as high temperature resistant ceramic fiber filter tubes, that results in gentle cleaning of the tube and reduces stresses on the tube during cleaning.

The filter system is used in connection with an enclosure or housing, with the system extending into the enclosure through a wall thereof such that gases can escape the enclosure only through the filter tubes of the filter system.

Figure 1:
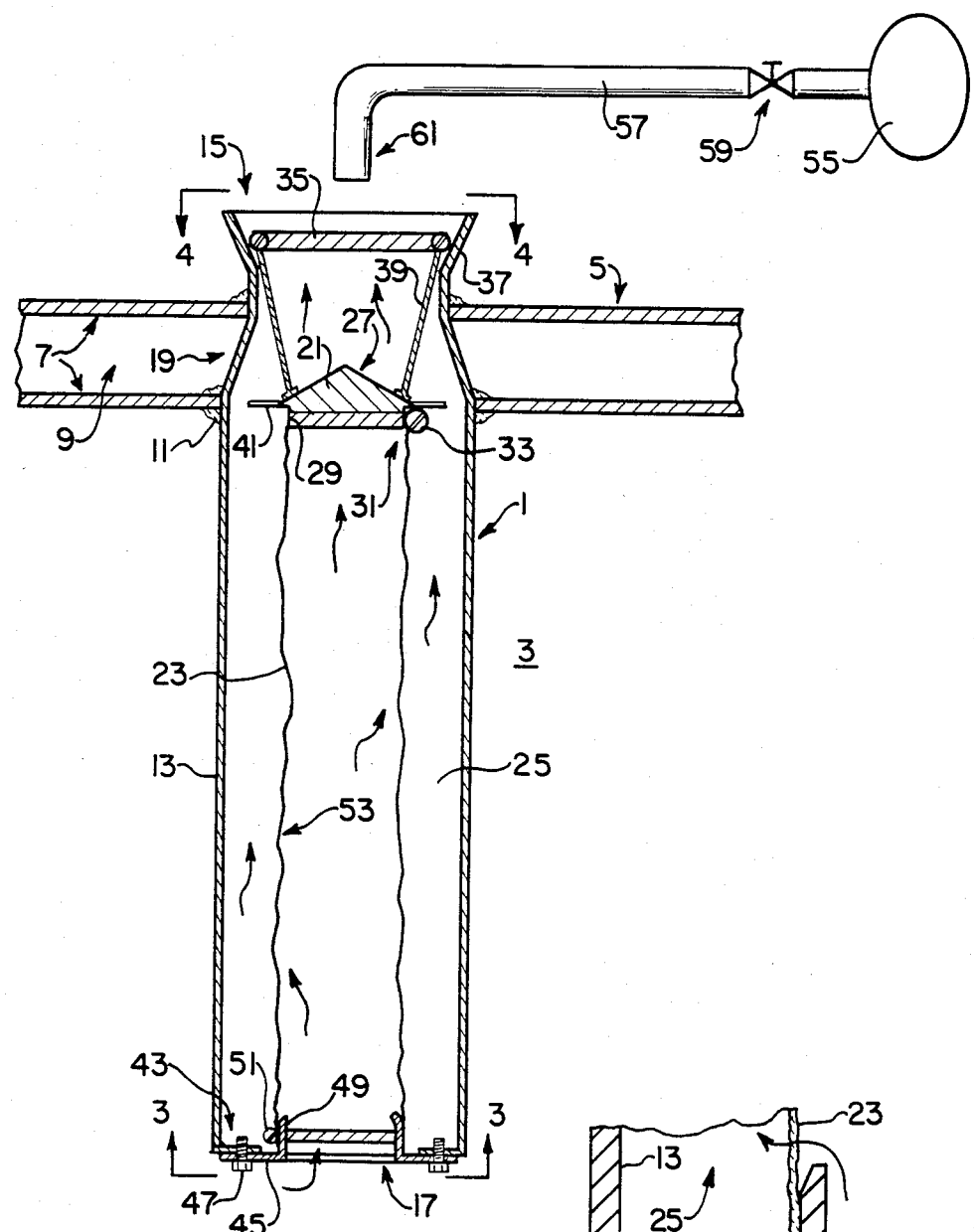
FIG. 1 is a cross-sectional view of the preferred embodiment of the filter system of the present invention, showing schematically the jet pulse means, with the filter tube coaxially secured with a cylindrical shell which extends into an enclosure.
Figure 2:
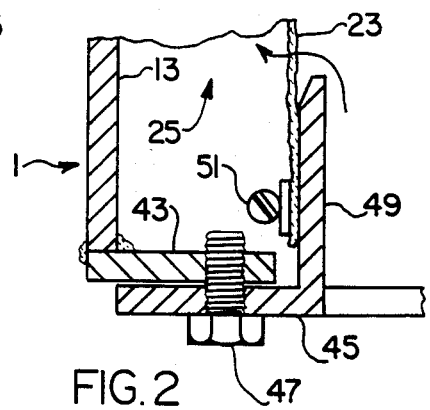
FIG. 2 is an enlarged cross-sectional view of a portion of the preferred securing and sealing means at the other end of the cylindrical shell to secure and seal the filter tube.
Figure 3:
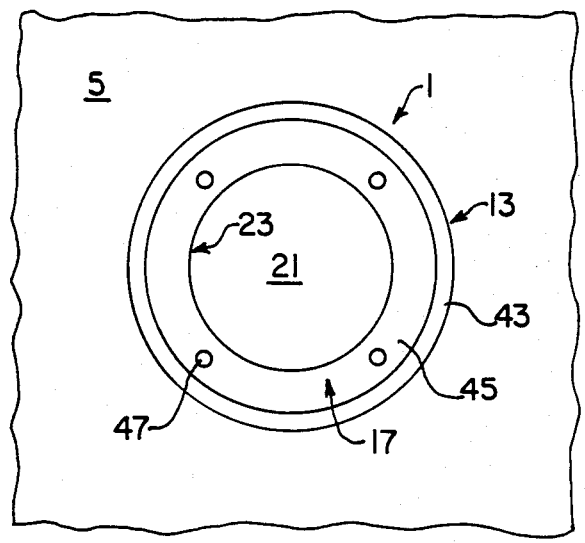
FIG. 3 is a view of the filter system taken along lines 3—3 of FIG. 1.
Figure 4:
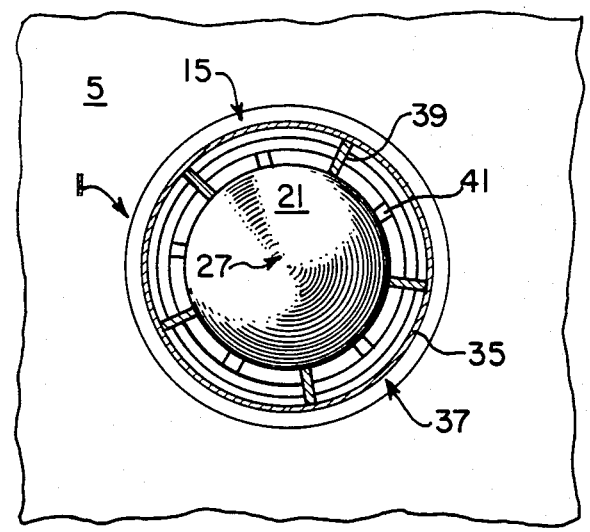
FIG. 4 is a view of the filter system taken along lines 4—4 of FIG. 1.

Referring now to FIG. 1, a cylindrical metallic shell 1 extends into an enclosure 3 through a wall 5 thereof, the wall 5 preferably comprising spaced plates 7 which provide for gas cooling of the wall 5, by flow of gases through the spacing 9 between the plates 7. The cylindrical shell 1 is secured to the wall 5, such as by welds 11, such that the enclosure 3 is sealed and gases which enter the enclosure 3 must exit through components in the cylindrical shell 1.

The cylindrical shell 1 has a gas impervious wall 13 and is open at both ends 15 and 17. Adjacent one end 15, which is outside the enclosure 3, the cylindrical shell 1 has a constriction 19, or eductor, which forms a venturi. Support means, such as a solid insert 21, is provided adjacent said one end 15 for supporting a filter tube 23 coaxially within the cylindrical shell 1, spaced from the impervious wall 13. With the filter tube 23 spaced from the impervious wall 13, an annular chamber 25 is formed therebetween.

The solid insert 21 has a diameter less than the interior diameter of the cylindrical shell, at the point of its location within the shell, so that gases may flow about the insert. The solid insert 21 is preferably a cone-shaped insert having an apex 27 facing the open end 15, and a channel 29 formed about the bottom periphery 31 thereof. The filter tube 23 is secured to and sealed against the channel 29 of the solid insert 21 by means of a releasable clamp 33. Positioning of the solid insert 21 within the cylindrical shell 1, as illustrated, is preferably by means of a ring-like member 35 positioned between the solid insert 21 and the open end 15, the ring-like member 35 resting on a surface 37 of the constriction 19, with a plurality of spaced connectors 39 connecting the solid insert 21 to the ring-like member 35. The connectors 39 may be in the form of wires or chains, with a plurality of the same spaced about the periphery of the ring-like member 35 to enable flow of gases thereabout. In order to center the solid insert 21, and the filter bag 23 attached thereto, in the cylindrical shell 1, a series of spaced projections 41 extend radially outward from the solid insert 21 towards the impervious wall 13 of the cylindrical shell 1.

The filter tube 23, coaxially supported by the solid insert 21 within the cylindrical shell 1, is secured to the other end 17 of the cylindrical shell 1 by attachment to an inwardly extending flange 43 at said other end 17 to seal the filter tube coaxially within the cylindrical shell 1. In the illustrated preferred embodiment, a circular collar 45 is releasably attached to the inwardly extending flange 43, such as by bolts 47, the circular collar 45 having a shoulder 49 extending into the cylindrical shell 1, with the end of the filter tube releasably secured to the shoulder 49 by a clamp 51.

The securement of the filter tube 23 coaxially within the cylindrical shell 1, and sealing of the tube therein to provide the annular chamber 25, ensures that any gases flowing from the enclosure 3 through the cylindrical shell 1, as indicated by the arrows in FIG. 1, must pass through the end 17, the filter tube 23, and into the annular chamber 25, about the solid insert 21 with its spaced projections 41, and the spaced connectors 39 and ring-like member 35 and exit the cylindrical shell through open end 15. Solids in the flow of gas will be collected on the interior surface 53 of the filter tube 23, which solids must be periodically removed.

In order to remove collected solids, or dust cake, from the interior surface 53 of the dust bag 23, jet pulsing is used. A source of gas under pressure 55 is provided which is connected to a line 57 containing a valve 59, the line 57 having a nozzle 61 positioned above the one open end 15 of the cylindrical shell 1. The cleaning of the filter tube 23 is illustrated in FIG. 5 which shows the flow of a pulse of gas from the nozzle 61. The pulse flow of gas, indicated by the arrows in FIG. 5, is directed from the nozzle 61 onto the apex 27 of the solid insert 21 and flows about the solid insert and into the annular chamber 25, causing the annular chamber to become slightly pressurized relative to the inside of the tube 23, and causes the filter tube 23 to gently flex inwardly. The inward flexing of the filter tube 23, which is still secured at both ends, will release solids collected on the inside surface 53 of the filter tube 23, which solids s are returned to the enclosure 3, and may be collected in a hopper (not shown) for subsequent removal. The degree of collapse of the filter tube 23 can be controlled by providing spaced hoops 63 along the length of the filter tube 23, as illustrated in FIG. 6, the spaced hoops 63 being secured to the inside of the filter tube 23 such as by sewing the same to the filter tube 23. The hoops 63 preferably have a diameter substantially equal to the interior diameter of the filter tube 23 and are provided in a number and spaced apart a distance to give the desired collapse of the filter tube 23.

In applications for high temperature filtration, ceramic-based filter tubes are used. Suitable such filters include filter tubes made from ceramic fibers woven into cloth which withstand temperatures up to about 1100° C. Such filter cloth can be woven from alumina-boria-silica ceramic and are manufactured by Minnesota Mining & Manufacturing Company. Another suitable type of ceramic cloth usable in the filter tubes is Fibrasil cloth, made by Carborundum Resistant Materials Company, usable in applications up to 982° C. The present system is usable at a wide range of pressure conditions within the enclosure, from slightly below atmospheric pressure to pressure up to about 211,000 Kg/m².

By use of the present filter system, the intensity of the cleaning procedure can be controlled, ranging from a vigorous pulse to a gentle flexing of the bag. Because of the reduced intensity, the smoother deformation of the fabric and the lack of a support cage, the bag life will be maximized. Also, filter tubes of greater length can be used. Typically, pulse jet filters can only be about 3 to 3.7 meters long because the pulse intensity is diminished at positions below this typical length. Since the present system is not constrained by this effect, longer tubes can be incorporated in designs and thereby make pressure vessel design for systems more effective and efficient. In addition, the present system allows for easier maintenance. Filter tube changeout can be accomplished from the bottom by removing the bottom flange, disconnecting the solid insert from the supporting ring-like member, and lowering the filter tube out of the shell assembly. Replacement occurs by connecting the solid insert, holding a filter tube, to the ring-like support and reattaching the bottom flange. This eliminates the need to remove either the blow back piping or the venturi sections in the clean side. This also eliminates a need for the high overhead clearances on the clean side that would have been required for top filter tube replacement.

In most instances, a plurality of the filters extend into an enclosure for gases. In the present system, dust dislodgement from a filter tube during cleaning is less likely to be reentrained and carried to the surface of the adjacent tubes because the dust cake exits from tubes at the plane of the bottom of the tube array. For this reason cleaning will be more efficient. Also, because of the confined nature of the dust dislodgement it is likely that tighter packing densities can be used in tube sheet design which will allow for lower cost, more compact systems.

Since the eductor/blow back means for the filter system can be fabricated as a unit in the shop, there is less likelihood of leaks and damaged gasketing. This is an important consideration when dealing with mechanical seals that operate at 500° to 1100° C. As such, we anticipate that the proposed structure will be more reliable. In addition, since the eductor system need never be removed, it can be incorporated in the mechanical design of a high temperature tube sheet. In uncooled applications, the design of the high temperature tube sheet is a major consideration since most structural metals have very little strength. Designs that achieve high moments of inertia by using separated tube sheets are likely to be required. The proposed arrangement of the venturi and shell is consistent with this requirement.

What is claimed is:

1. A filter system for separation of particulate material from a flow of gas containing the same wherein said flow of gas is passed to an enclosure comprising:
    a cylindrical shell having an impervious wall, said shell open at both ends thereof and having a constricted section adjacent one open end;
    means for supporting the cylindrical shell within the said enclosure such that gases entering the enclosure are discharged through said cylindrical shell;
    means adjacent said one open end for supporting a filter tube coaxially within said cylindrical shell spaced from said impervious wall to form an annular chamber therebetween;
    means for securing said filter tube to the other end of said cylindrical shell to seal said other end such that gases entering said cylindrical shell pass through said filter tube and into said annular chamber prior to discharge through said one open end; and
    means to provide a jet pulse of fluid to said annular chamber to flex the filter tube inwardly relative to said impervious wall.

2. A filter system as defined in claim 1 wherein said means for supporting the cylindrical shell within said enclosure comprises spaced plates, surrounding said shell, formed as a wall of said enclosure.

3. A filter system as defined in claim 1 wherein said means for supporting the filter tube within said cylindrical shell comprises a solid insert having a diameter less than the diameter of said cylindrical shell spaced from the impervious wall of said shell and from said one open end.

4. A filter system as defined in claim 3 wherein said solid insert is positioned within said cylindrical shell by a ring-like member positioned between said solid insert and said open end, and said insert is connected to said ring-like member by a plurality of spaced connectors.

5. A filter system as defineld in claim 4 wherein said connectors comprise wire-like connectors.

6. A filter system as defined in claim 4 wherein said connectors comprise chain-like connectors.

7. A filter system as defined in claim 3 wherein said solid insert has spaced projections thereabout to center said insert relative to said cylindrical shell.

8. A filter system as defined in claim 3 wherein said solid insert comprises a cone-shaped insert having a channel about the bottom periphery thereof, with the apex of said cone facing said open end.

9. A filter system as defined in claim 8 wherein said filter tube is secured and sealed against the channel of said cone-shaped insert by a releasable clamp.

10. A filter system as defined in claim 1 wherein said other end of the cylindrical shell has an inwardly extending flange and said filter tube is secured to said flange.

11. A filter system as defined in claim 10 wherein a circular collar is releasably attached to said inwardly extending flange and the filter tube is releasably secured to said collar.

12. A filter system as defined in claim 11 wherein said circular collar has a shoulder thereon coaxial with said cylindrical shell and the filter tube is releasably secured to the shoulder of said collar.

13. A filter system as defined in claim 12 wherein the filter tube is releasably secured to the shoulder of said circular collar by means of a clamp surrounding said shoulder.

14. A filter system as defined in claim 13 wherein said circular collar is releasably attached to said inwardly directed flange by bolts.

15. A filter system as defined in claim 1 wherein spaced hoops are provided along the length of said filter tube, said hoops secured to the inside of said filter tube.

16. The filter system as defined in claim 15 wherein said hoops have a diameter substantially equal to the interior diameter of said filter tube.

17. The filter system as defined in claim 1 wherein said filter tube is comprised of ceramic fibers.

18. A filter system for separation of particulate material from a flow of gas containing the same wherein said flow of gas is passed to an enclosure comprising:
- a cylindrical shell having an impervious wall, said shell open at both ends thereof and having a constricted section adjacent one open end;
- means for supporting the cylindrical shell within the said enclosure such that gases entering the enclosure are discharged through said cylindrical shell;
- a solid insert having a diameter less than the diameter of said cylindrical shell is provided therein spaced from the impervious wall of the shell and from said one open end;
- a ring-like member positioned between said solid insert and said open end, with said insert connected to said ring-like member by a plurality of spaced connectors;
- means for securing a filter tube to said solid insert, coaxially within said cylindrical shell spaced from said impervious wall to form an annular chamber therebetween;
- an inwardly directed flange on the other end of said cylindrical shell;
- means for securing said filter tube to said inwardly directed flange to seal said other end such that gases entering said cylindrical shell pass through said filter tube and into said annular chamber prior to discharge through said one open end; and
- means to provide a jet pulse of fluid to said annular chamber to flex the filter tube inwardly relative to said impervious wall.

19. A filter system as defined in claim 18 wherein the solid insert has spaced projections thereabout to center said insert relative to said cylindrical shell.

20. A filter system as defined in claim 18 wherein said means for supporting the cylindrical shell within said enclosure comprises spaced plates, surrounding said shell, formed as a wall of said enclosure.

21. A filter system as defined in claim 18 wherein a circular collar is releasably attached to said inwardly extending flange, the collar having a shoulder thereon coaxial with said cylindrical shell, and the filter tube is releasably secured to the shoulder of said collar.

22. A filter system as defined in claim 18 wherein spaced hoops are provided along the length of said filter tube, said hoops secured to the inside of said filter tube.

23. The filter system as defined in claim 18 wherein said filter tube is comprised of ceramic fibers.

* * * * *